United States Patent [19]

Tsunoda

[11] 3,857,296

[45] Dec. 31, 1974

[54] VIBRATION-DAMPED ROTATABLE DRIVE MEMBER

[75] Inventor: Kenneth Tsunoda, Closter, N.J.

[73] Assignee: Paul W. Garbo, Freeport, N.Y. ; a part interest

[22] Filed: Feb. 11, 1974

[21] Appl. No.: 441,430

Related U.S. Application Data

[62] Division of Ser. No. 165,498, July 23, 1971, Pat. No. 3,799,025.

[52] U.S. Cl. ................................................. 74/443
[51] Int. Cl. ............................................ F16h 55/14
[58] Field of Search ...................................... 74/443

[56] References Cited
UNITED STATES PATENTS 3,566,710  3/1971  Long..................................... 74/443

*Primary Examiner*—Leonard H. Gerin
*Attorney, Agent, or Firm*—Paul W. Garbo

[57] ABSTRACT

The noise generated by a rotating disk-like member when it contacts a movable element is appreciably diminished by coating one surface of the disk-like member with a viscoelastic material and adhering a rigid sheet to the viscoelastic material. Gear wheels illustrate rotatable drive disks that are vibration-damped pursuant to the invention.

10 Claims, 3 Drawing Figures

PATENTED DEC 31 1974 3,857,296

VIBRATION-DAMPED ROTATABLE DRIVE MEMBER

BACKGROUND OF THE INVENTION:

This application is a division of copending application Ser. No. 165,498 filed July 23, 1971, now U.S. Pat. No. 3,799,025.

This invention relates to a rotatable disk-like member which contacts a movable element but is vibration-damped and acoustically deadened.

Rotatable disk-like drive members, such as gear wheels and cam plates which contact a moving element have long been a source of intense noise particularly when such members attain high rotational speeds. For instance, a gear wheel meshing with a gear rack or another gear wheel generates troublesome noise.

Accordingly, the object of this invention is to provide an improved structure for rotatable disk-like members that are vibration-damped and, therefore, acoustically deadened when driven at high rotational speed in contact with a movable element.

All the disk-like drive members to which this invention is applicable are not necessarily circular; for example, rotary cam plates can have all sorts of non-circular shapes. Likewise, such disk-like members are not necessarily flat; they may be slightly tapered or dished on one or both faces. Moreover, the disk-like members may have openings or cut-outs extending therethrough, usually to diminish the weight of the members. For simplicity of the description of the invention, all such variations of disk-like members shall hereinafter be embraced by the term, disk.

SUMMARY OF THE INVENTION

In accordance with this invention, the vibration-damping of a rotatable drive disk is achieved by applying a layer of viscoelastic material to one of the two sides of the disk and bonding a relatively rigid sheet to the layer of viscoelastic material.

The viscoelastic material may be any elastomeric material having high mechanical hysteresis or internal friction but low modulus of elasticity compared to the disk and the relatively rigid sheet between which the viscoelastic material is disposed. The efficiency of damping depends not only on the energy dissipation capacity of the viscoelastic layer but also on the proper coupling of the disk, the viscoelastic material and the relatively rigid sheet or constraining layer so that the vibrating energy of the disk is transferred to the viscoelastic layer and dissipated as heat. Amorphous polymers or copolymers, such as natural or synthetic rubber, polyvinyl chloride or alcohol, polypropylene, polyurethane and the like are suitable viscoelastic materials for the purpose of this invention. Glycol-diisocyanate copolymers are particularly desirable for use as the viscoelastic layer of the rotatable disk of this invention.

Generally, it is advisable to make the thickness of the layer of viscoelastic material not more than about half of the thickness of the portion of the rotatable disk on which it is applied and not more than about the full thickness of the relatively rigid or stiff sheet which is bonded thereto. Generally, the rigid sheet has a thickness less than that of the disk; in many cases, the rigid sheet is preferably not more than about half as thick as the disk. It is often preferable to make the combined thickness of the rigid sheet and the viscoelastic layer not more than about the thickness of the disk.

The rotatable drive disk, such as a gear wheel or a cam plate, is commonly made of ordinary steel. However, other metals including stainless steel, brass, bronze and various alloys, or relatively rigid plastics are also used to make some rotatable disks.

The relatively rigid sheet which is bonded to the viscoelastic layer may be made of the same metal as the rotatable disk or of a different metal. This relatively rigid sheet or constraining layer may also be made of materials other than metals. Suitable rigid materials include ceramic products or hard plastics.

The rigid sheet or constraining layer which adheres to the layer of viscoelastic material is usually continuous or unitary but may be segmented. When the rigid sheet is in the form of two or more segments, which in some instances are more easily applied to the viscoelastic layer than a single unit can be, the segments are separated from each other by narrow gaps or clearances. In this way, adjacent segments are prevented from rubbing or contacting one another even when the rotating disk associated therewith undergoes substantial vibration. It is advisable to arrange the rigid sheet segments so as to be symmetrical and balanced relative to the axis of the rotary disk to which they are attached by the viscoelastic layer. Otherwise, any unbalance upsets the smooth operation of the rotatable disk at high rotational speed.

For a fuller understanding of the invention, illustrative embodiments will now be described in detail in connection with the accompanying drawings.

DESCRIPTION OF PREFERRED EMBODIMENTS

Figure 1:
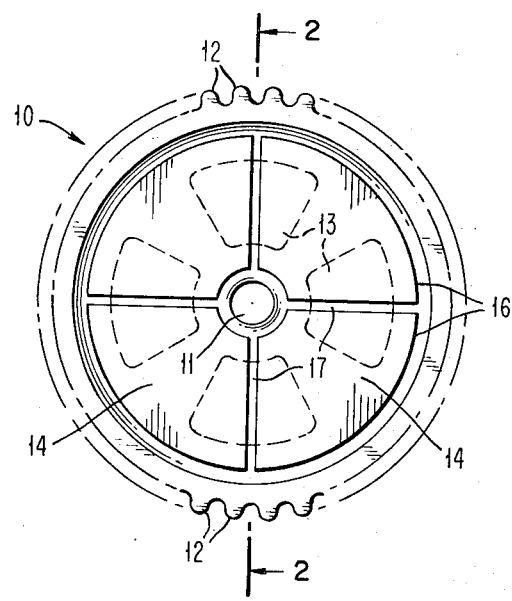
FIG. 1 is a front view of a gear wheel with the vibration-damping of this invention.
Figure 2:
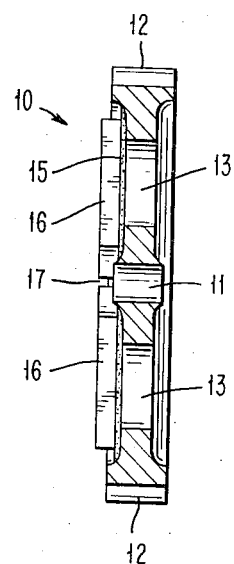
FIG. 2 is a sectional view of the gear wheel of FIG. 1 taken along the line 2—2.

FIGS. 1 and 2 show gear wheel 10 having central aperture 11 and gear teeth 12 on its periphery. Gear wheel 10 has four equally spaced openings 13 extending therethrough to decrease the weight of gear wheel 10. The areas of wheel 10 between adjacent openings 13 are in effect web-like spokes 14 between the hub portion around central hole 11 and the peripheral portion provided with gear teeth 12. Layer 15 of viscoelastic material coats one face of wheel 10 and four equal circular segments 16 of a rigid sheet are bonded to layer 15 with narrow gaps 17 between adjacent segments 16. While rigid segments 16 are shown as extending over openings 13 in gear wheel 10, the portion of each segment 16 extending over an opening 13 may be cut away if desired.

Figure 3:
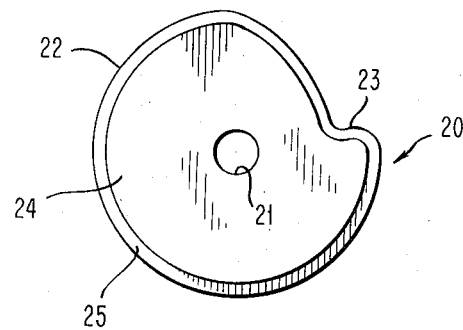
FIG. 3 is a front view of a rotatable cam plate which is provided with a constraining layer.

FIG. 3 shows the face of rotatable cam plate 20 having hole 21 for mounting on a rotary shaft and outer edge 22 which includes a stepped or cut-out section 23. As known, a cam follower roller is provided to ride in contact with edge 22 including section 23 thereof as cam plate 20 is rotated. Rigid sheet 24 with substantially the same configuration of cam plate 20 but slightly smaller than plate 20 is attached to plate 20 by an intervening layer of viscoelastic material. Marginal band 25 along edge 22 of cam plate 20 is not covered by rigid sheet 24 to ensure that the cam follower roller riding on edge 22 will not also contact sheet 24.

It is well to note in the foregoing embodiments of the invention that appreciable vibration-damping of a rotary disk is achieved with a constraining layer covering a substantial portion of one surface of the rotatable disk. Generally, at least 40% of the area of the disk face is covered by the constraining layer. Of course, the greater the coverage is, the greater will be the vibration-damping of the rotary disk. Therefore, preferably the rigid sheet or constraining layer covers at least 60% of the face area of the rotatable disk to which the rigid sheet is bonded by the viscoelastic material.

What is claimed is:

1. A vibration-damped rotatable drive disk that contacts a movable element during rotation, which comprises a layer of viscoelastic material adherent to one face of said disk, and a relatively rigid sheet of a thickness less than that of said disk bonded to said layer of viscoelastic material.

2. The vibration-damped rotatable drive disk of claim 1 wherein the layer of viscoelastic material has a thickness of not more than about half of the thickness of said disk.

3. The vibration-damped rotatable drive disk of claim 1 wherein the layer of viscoelastic material comprises a material selected from the group consisting of amorphous polymers and copolymers.

4. The vibration-damped rotatable drive disk of claim 1 wherein said disk and the rigid sheet are made of metal.

5. The vibration-damped rotatable drive disk of claim 1 wherein said disk is a gear wheel and the combined thickness of the rigid sheet and the layer of viscoelastic material is not more than about the thickness of said gear wheel.

6. The vibration-damped gear wheel of claim 5 wherein the rigid sheet is in the form of equal circular segments bonded to the layer of viscoelastic material with small gaps between adjacent segments.

7. The vibration-damped gear wheel of claim 5 wherein said gear wheel and the rigid sheet are made of metal and the viscoelastic material comprises a material selected from the group consisting of amorphous polymers and copolymers.

8. The vibration-damped rotatable drive disk of claim 1 wherein said disk is a cam plate and the combined thickness of the rigid sheet and the layer of viscoelastic material is not more than about the thickness of said cam plate.

9. The vibration-damped cam plate of claim 8 wherein the rigid sheet is slightly smaller than said cam plate and thus leaves a marginal band along the edge of said cam plate uncovered.

10. The vibration-damped cam plate of claim 9 wherein said cam plate and the rigid sheet are made of metal and the viscoelastic material comprises a material selected from the group consisting of amorphous polymers and copolymers.

* * * * *